(12) United States Patent
Lu

(10) Patent No.: US 12,545,018 B2
(45) Date of Patent: Feb. 10, 2026

(54) EMBOSSING APPARATUS FOR PRODUCING FLUFFY MULTILAYER WEB PRODUCT

(71) Applicant: CHAN LI MACHINERY CO., LTD., Taoyuan (TW)

(72) Inventor: Yi-Hsiu Lu, Taoyuan (TW)

(73) Assignee: Chan Li Machinery Co., Ltd., Taoyuan (TW)

( * ) Notice: Subject to any disclaimer, the term of this patent is extended or adjusted under 35 U.S.C. 154(b) by 699 days.

(21) Appl. No.: 17/985,593

(22) Filed: Nov. 11, 2022

(65) Prior Publication Data

US 2024/0116286 A1    Apr. 11, 2024

(30) Foreign Application Priority Data

Oct. 5, 2022   (TW) .................................. 111137791

(51) Int. Cl.
| | |
|---|---|
| *B32B 38/06* | (2006.01) |
| *B32B 37/00* | (2006.01) |
| *B32B 37/10* | (2006.01) |
| *B32B 38/00* | (2006.01) |
| *B32B 38/08* | (2006.01) |

(52) U.S. Cl.
CPC .......... *B32B 38/06* (2013.01); *B32B 37/0038* (2013.01); *B32B 37/10* (2013.01); *B32B 38/08* (2013.01); *B32B 2038/0056* (2013.01)

(58) Field of Classification Search
None
See application file for complete search history.

(56) References Cited

U.S. PATENT DOCUMENTS

2019/0111651 A1*  4/2019  Paolinelli .................. B31F 1/07

FOREIGN PATENT DOCUMENTS

| CN | 101824720 A | 9/2010 | |
|---|---|---|---|
| CN | 110923949 A | 3/2020 | |
| CN | 111877045 A * | 11/2020 | .............. F26B 21/04 |
| JP | 2007276285 A * | 10/2007 | |

(Continued)

OTHER PUBLICATIONS

CN111877045A_machine_translation (Year: 2020).*

(Continued)

*Primary Examiner* — Michael N Orlando
*Assistant Examiner* — Abhishek A Patwardhan
(74) *Attorney, Agent, or Firm* — Rosenberg, Klein & Lee

(57) ABSTRACT

An embossing apparatus for producing a fluffy multilayer web product includes a first embossing assembly that forms a first embossed pattern on a first web product and a second embossing assembly that forms a second embossed pattern on a second web product. The first web product is humidified by a first humidifying device before being conveyed to the first web product embossing assembly, and the second web product is humidified by a second humidifying device before being conveyed to the second web product embossing assembly. The first web product that is formed with the first embossed pattern is applied with glue and then conveyed, together with the second web product that is formed with the second embossed pattern, to pass between a laminating roller and the first steel embossing roller to be then out fed along an out-feeding path.

9 Claims, 3 Drawing Sheets

(56) References Cited

FOREIGN PATENT DOCUMENTS

| JP | 2012110407 | A | * | 6/2012 |
|----|-----------|---|---|--------|
| JP | 2019510660 | A |   | 4/2019 |

OTHER PUBLICATIONS

JP2007276285A_machine_translation (Year: 2007).*
JP2012110407A_machine_translation (Year: 2012).*
First Office Action mailed to Corresponding Chinese Patent Application No. 111137791 on Jul. 31, 2023.
First Office Action mailed to Corresponding Japanese Patent Application No. 2022193454 on Jul. 4, 2023.

* cited by examiner

EMBOSSING APPARATUS FOR PRODUCING FLUFFY MULTILAYER WEB PRODUCT

BACKGROUND OF THE INVENTION

1. Field of the Invention

The present invention relates to an embossing apparatus for web product, and more particularly to an embossing apparatus for producing fluffy multilayer web product.

2. The Related Arts

Web products are widely used in daily living, commercial applications, and industrial applications. Web products having embossed/debossed patterns are now the main stream of contemporary uses.

To make various embossed/debossed patterned on a web product, it is common to pass the web product through an embossing roller set, in which an embossing pattern on the embossing roller set is imprinted on the web product so as to form an embossed pattern on the web product. Further, to make the web product fluffy and solid hand-feeling when used by users, two or more web products are glued and laminated together to form a web product having a three-dimensional embossed pattern.

However, in the prior art, in a fabrication process for making an embossed pattern on a web product, it is easy that the fibrous structure of the web product is damaged due to insufficiency of stretchability for the web product. Consequently, the web product may easily exhibit situations of collapsing or unclear pattern due to insufficient support in the embossed pattern of the web product. This makes the user, when using such a web product, feel the web product that is manufactured with such a known technique has a poor quality.

Further, to enhance fluffiness and solidness of hand-feeling, and also to provide sufficient support, for a web product, the manufacturers often adopt a solution of increasing the amount of the fibrous material used in such a product. This inevitably increases the expenses for the fibrous materials in the fabrication of the web product.

SUMMARY OF THE INVENTION

In view of the above, the primary objective of the present invention is to provide an embossing apparatus for producing a laminated multilayer web product featuring excellent fluffiness, good supporting, solid hand-feeling, collapse resistance of embossed patterns, and clearness of embossed patterns.

A technical solution adopted in the present invention comprises a first embossing assembly that forms a first embossed pattern on a first web product and a second embossing assembly that forms a second embossed pattern on a second web product. The first web product is humidified by a first humidifying device before being conveyed to the first web product embossing assembly, and the second web product is humidified by a second humidifying device before being conveyed to the second web product embossing assembly. The first web product that is formed with the first embossed pattern is applied with glue and then conveyed, together with the second web product that is formed with the second embossed pattern, to pass between a laminating roller and a first steel embossing roller to be then out fed along an out-feeding path.

Preferably, the second embossing assembly further comprises an airflow guide device, and the airflow guide device comprises a pair of airflow hoods facing toward each other to cover and enclose at least a portion of a roller surface of a second steel embossing roller. The pair of airflow hoods are each provided with a concave arc section facing the roller surface of the second steel embossing roller, and a plurality of nozzles are formed in the concave arc section.

Preferably, the airflow guide device is optionally operable to blow a hot airflow or a cold airflow toward the roller surface of the second steel embossing roller.

Preferably, the first steel embossing roller is arranged at a lower position relative to a first rubber embossing roller, and the second steel embossing roller is arranged at an upper position relative to a second rubber embossing roller.

Preferably, a first feeding path is set at an upper position relative to the first rubber embossing roller to convey the first web product over an upper side of the first rubber embossing roller to reach and pass between the first rubber embossing roller and the first steel embossing roller. A second feeding path is set at a lower position relative to the second rubber embossing roller to convey the second web product over a lower side of the second rubber embossing roller to reach and pass between the second rubber embossing roller and the second steel embossing roller.

Preferably, the first steel embossing roller, the second steel embossing roller, the first rubber embossing roller, and the second rubber embossing roller are optionally provided with a heating device.

Preferably, the first embossing assembly and the second embossing assembly are arranged in a vertical configuration.

Preferably, the humidifying device comprises an ultrasonic water-mist spray-wetting device.

Preferably, the humidifying device comprises a water applicator roller based humidifier that is operable to apply water on a web product.

In respect of efficacy, a multilayer web product that is made by means of spray-wetting, heating-drying, and air-drying operations according to present invention, in combination with various sizes of embossed patterns (namely small-sized and large-sized patterns) and various heights (namely high and low patterns) allows a user to feel, during use thereof, excellent fluffiness, good supporting, and solid hand-feeling. In respect of visual effect, the embossed/debossed pattern on the multilayer web product according to the present invention is not easy to collapse and shows a clear embossed/debossed pattern.

Further, since the laminated multilayer web product according to the present invention shows excellent fluffiness and has a structure exhibiting good supporting, the amount of fibrous materials used therein can be reduced, to thereby achieve an effect of saving material cost.

In respect to structural arrangement, in this invention, the first steel embossing roller and the first rubber embossing roller of the first embossing assembly are lined up in the vertical direction, and the second steel embossing roller and the second rubber embossing roller of the second embossing assembly are also lined up in the vertical direction. The first web product is conveyed along the first feeding path to pass over an upper side of the first rubber embossing roller to then reach and move between the first rubber embossing roller and the first steel embossing roller. The second web product is conveyed along the second feeding path to pass over a lower side of the second rubber embossing roller to then reach and move between the second rubber embossing roller and the second steel embossing roller. Compared to a known structural arrangement, the present invention does not require an arrangement of multiple guide rollers to set a desired coverage angle for a web product relative to the steel embossing roller that is required in the prior art. Thus, the present invention is advantageous in occupying a small floor area and saving space of workshop.

A technical measure adopted in the present invention will be further described with reference to embodiments provided below and the attached drawings.

DETAILED DESCRIPTION OF THE PREFERRED EMBODIMENTS

Figure 1:
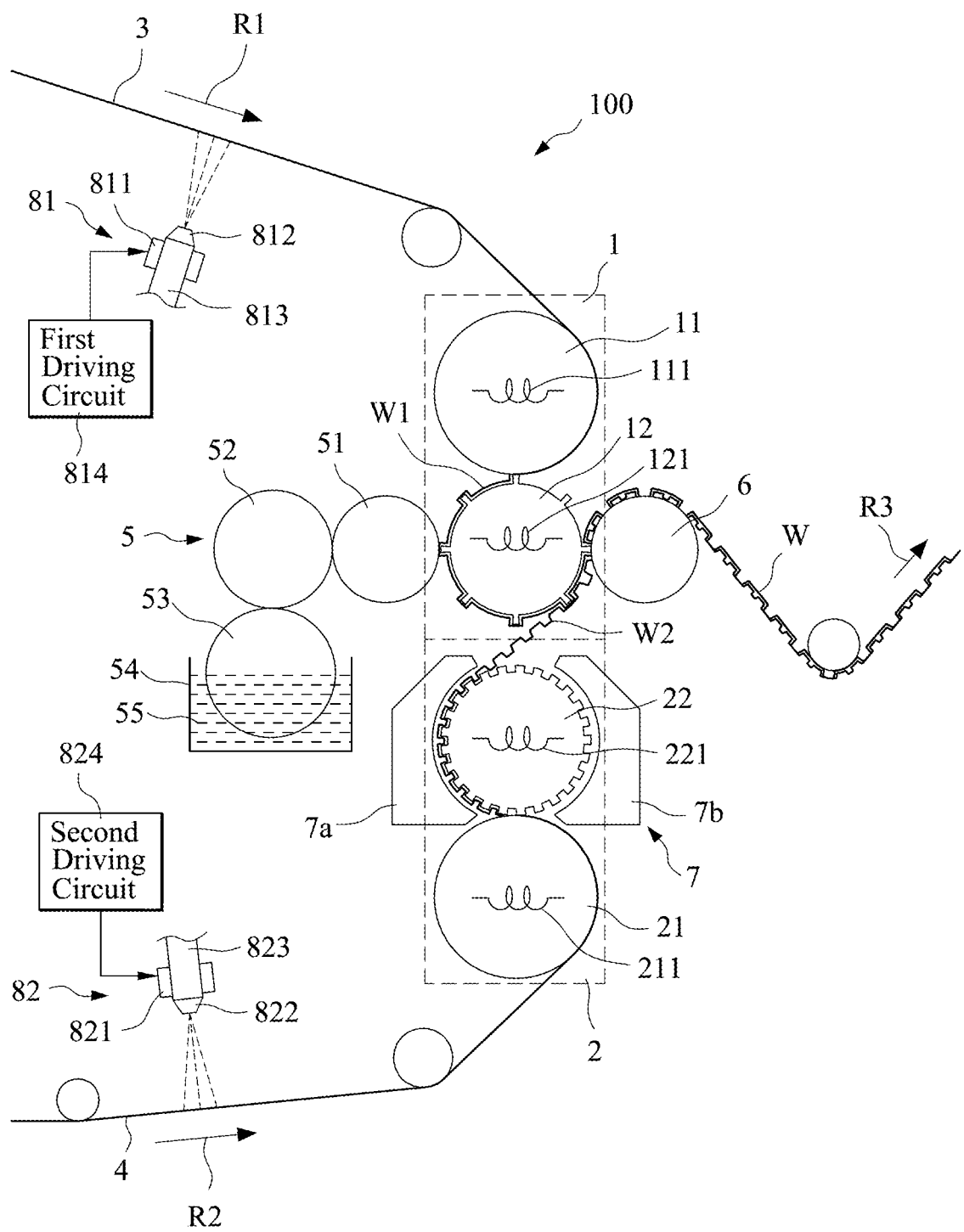
FIG. 1 is a schematic view showing an embossing apparatus according to a first embodiment of the present invention.

Referring to FIG. 1, the present invention provides an embossing apparatus 100, which comprises a first embossing assembly 1 and a second embossing assembly 2. The first embossing assembly 1 and the second embossing assembly 2 are arranged in a vertical configuration. That is, the second embossing assembly 2 is located at a lower position relative to the first embossing assembly 1.

The first embossing assembly 1 comprises a first rubber embossing roller 11 and a first steel embossing roller 12. The first steel embossing roller 12 is adjacent to the first rubber embossing roller 11, and is set at a lower position relative to the first rubber embossing roller 11.

A first feeding path R1 is defined at an upper position relative to the first rubber embossing roller 11, and a first web product 3 is moved along the first feeding path R1 to pass an upper side of the first rubber embossing roller 11 to be conducted into and conveyed between the first rubber embossing roller 11 and the first steel embossing roller 12. The first steel embossing roller 12 has a surface that is formed with a recessing-raising structure, so that the first web product 3, when conveyed between the first rubber embossing roller 11 and the first steel embossing roller 12, is subjected to embossing/debossing to form a first embossed pattern W1 on the first web product 3.

The second embossing assembly 2 comprises a second rubber embossing roller 21 and a second steel embossing roller 22. The second steel embossing roller 22 is adjacent to the second rubber embossing roller 21, and is set at an upper position relative to the second rubber embossing roller 21.

A second feeding path R2 is defined at a lower position relative to the second rubber embossing roller 21, and a second web product 4 is moved along the second feeding path R2 to pass a lower side of the second rubber embossing roller 21 to be conducted into and conveyed between the second rubber embossing roller 21 and the second steel embossing roller 22. The second steel embossing roller 22 has a surface that is formed with a recessing-raising structure, so that the second web product 4, when conveyed between the second rubber embossing roller 21 and the second steel embossing roller 22, is subjected to embossing/debossing to form a second embossed pattern W2 on the second web product 4.

In a preferred embodiment of the present invention, the first rubber embossing roller 11, the first steel embossing roller 12, the second rubber embossing roller 21, and the second steel embossing roller 22 are each optionally provided with a heating device 111, 121, 211, 221 to respectively and individually heat up the first rubber embossing roller 11, the first steel embossing roller 12, the second rubber embossing roller 21, and the second steel embossing roller 22. The heating devices 111, 121, 211, 221 can each be a heating bar, a steam channel, a high-temperature oil channel, or any other equivalent heating apparatus.

A glue applying device 5 is arranged at a position adjacent to the first steel embossing roller 12. The glue applying device 5 comprises a glue applicator roller 51 that corresponds to the first steel embossing roller 12. Being put into rotation, the glue applicator roller 51 acquires glue 55 from a glue reservoir 54 by means of glue attaching rollers 52, 53, so that when the first web product 3 is passing between the first steel embossing roller 12 and the glue applying device 5, the glue applicator roller 51 applies a proper amount of the glue 55 onto one surface of the first web product 3.

A laminating roller 6 is adjacent to the first steel embossing roller 12 and is arranged opposite to the glue applying device 5. The first web product 3 and the second web product 4, after being subjected to embossing/debossing by the first embossing assembly 1 and the second embossing assembly 2 to form the first embossed pattern W1 and the second embossed pattern W2, are conveyed to pass between the first steel embossing roller 12 and the laminating roller 6, so as to have the first web product 3 and the second web product 4 correspondingly laminated together to be then fed out along an out-feeding path R3.

Figure 2:
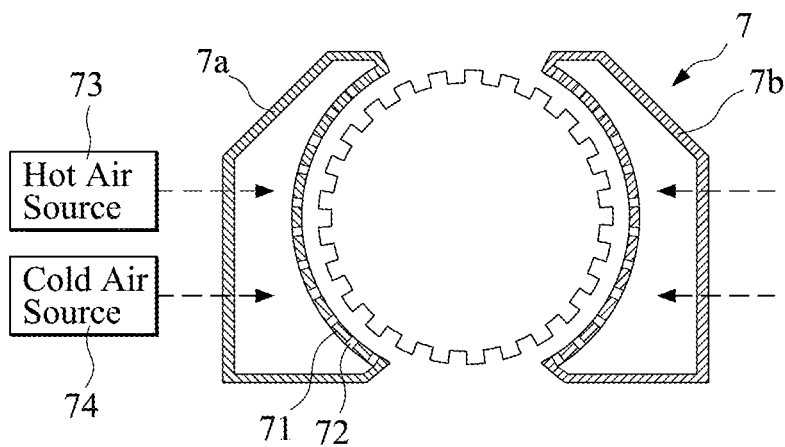
FIG. 2 is a schematic view, in an enlarged form, showing an airflow guide device arranged outside a roller surface of a second steel embossing roller of the present invention shown in FIG. 1.
Figure 3:
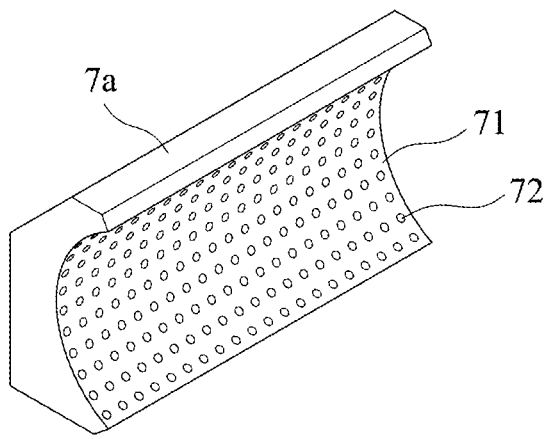
FIG. 3 is a perspective view showing an airflow hood shown in FIG. 2.

FIG. 2 is a schematic view, in an enlarged form, showing an airflow guide device 7 arranged outside a roller surface of the second steel embossing roller 22 according to the present invention; and FIG. 3 is a perspective view showing an airflow hood of the airflow guide device. The airflow guide device 7 comprises the airflow hood that is arranged to cover and enclose at least a portion of the roller surface of the second steel embossing roller 22. For example, the airflow guide device 7 comprises a pair of airflow hoods 7a, 7b, which are respectively arranged outside and covering two opposite parts of the roller surface of the second steel embossing roller 22 on left and right sides thereof. Taking one of the airflow hoods, which is the airflow hood 7a, the airflow hood 7a comprises a concave arc section 71 that faces and corresponds to the roller surface of the second steel embossing roller 22. The concave arc section 71 is spaced from the roller surface of the second steel embossing roller 22 by a predetermined distance, and the concave arc section 71 is opened with a plurality of nozzles 72 that face and correspond to the roller surface of the second steel embossing roller 22.

The airflow hoods 7a, 7b of the airflow guide device 7 are provided with a hot air source 73 and/or a cold air source 74 that is built therein or is connected thereto by means of a known connection tube. Based on a practical requirement of fabrication, the airflow guide device 7 may conducts a hot airflow from the hot air source 73 or a cold airflow from the cold air source 74 to pass through the nozzles 72 to blow toward the roller surface of the second steel embossing roller 22. The hot airflow blowing through the nozzles 72 of the airflow guide device 7 toward the second steel embossing roller 22 helps dry a portion of the second web product 4 that is conveyed onto and thus located on the second steel embossing roller 22; and the cold airflow blowing through the nozzles 72 of the airflow guide device 7 toward the second steel embossing roller 22 helps cool down the second steel embossing roller 22.

The present invention comprises a first humidifying device 81, which is arranged at a position adjacent to the first feeding path R1, in order to humidify the first web product 3 before it is conveyed to the first rubber embossing roller 11 of the first embossing assembly 1. The first web product 3, after being properly humidified and thus wetted by the first humidifying device 81, would increase the stretchability of the fibers thereof, and is afterwards conveyed into and passing between the first rubber embossing roller 11 and the first steel embossing roller 12 to subject to pattern embossing/debossing (shaping) to make the first embossed pattern W1. The first web product 3, after being formed with the first embossed pattern W1, is subjected to heating-drying by the first steel embossing roller 12, and is then subjected to coating of the glue 55 on a selected site of one surface of the first web product 3 by means of the glue applying device 5, so as to make the first web product 3 more stiff, providing a final product with better fluffiness and sold hand-feeling.

The first humidifying device 81 may include or adopt an ultrasonic water-mist spray-wetting device, which comprises a first piezoelectric component 811, a first spray nozzle 812, and a first water supply pipe 813 connected to the first spray nozzle 812. A first driving circuit 814 drives the first piezoelectric component 811 to induce ultrasonic oscillation in water that passes through the first water supply pipe 813, so as to generate a water mist at the first spray nozzle 812 to fulfill an effect of humidifying on the first web product 3 moving along the first feeding path R1.

The present invention also comprises a second humidifying device 82, which is arranged at a position adjacent to the second feeding path R2, in order to humidify the second web product 4 before it is conveyed to the second rubber embossing roller 21 of the second embossing assembly 2. The second web product 4, after being properly humidified and thus wetted by the second humidifying device 82, would increase the stretchability of the fibers thereof, and is afterwards conveyed into and passing between the second rubber embossing roller 21 and the second steel embossing roller 22 to subject to pattern embossing/debossing (shaping) to make the second embossed pattern W2. The second web product 4, after being formed with the second embossed pattern W2, is subjected to heating-drying by the second steel embossing roller 22 and air-drying by the airflow guide device 7.

The second humidifying device 82 may include or adopt an ultrasonic water-mist spray-wetting device, which comprises a second piezoelectric component 821, a second spray nozzle 822, and a second water supply pipe 823 connected to the second spray nozzle 822. A second driving circuit 824 drives the second piezoelectric component 821 to induce ultrasonic oscillation in water that passes through the second water supply pipe 823, so as to generate a water mist at the second spray nozzle 822 to fulfill an effect of humidifying on the second web product 4 moving along the second feeding path R2.

Figure 4:
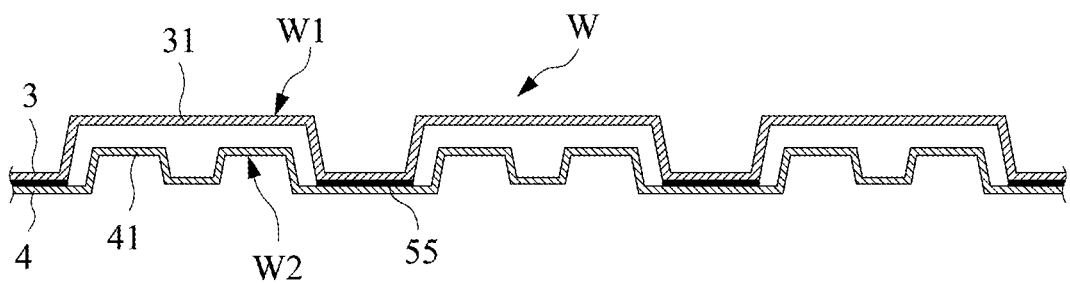
FIG. 4 is a cross-sectional view showing a laminated multilayer web product formed by laminating a first web product and a second web product according to the present invention.

FIG. 4 is a cross-sectional view showing a laminated multilayer web product W formed by laminating the first web product 3 and the second web product 4, respectively at upper and lower sides. As shown in the drawing, the first web product 3, after being subjected to embossing/debossing by the first embossing assembly 1, is formed with the first embossed pattern W1 that is formed of a plurality of large-sized embossing zones 31. Similarly, the second web product 4, after being subjected to embossing/debossing by the second embossing assembly 2, is formed with the second embossed pattern W2 that is formed of a plurality of small-sized embossing zones 41.

The first web product 3 and the second web product 4 are cemented together at selected regions by the glue 55, and are then laminated together by the laminating roller, as being respectively at upper and lower sides to form the laminated multilayer web product of the present invention. In a preferred embodiment, an individual one of the large-sized embossing zones 31 is large enough to cover two or more than two of the small-sized embossing zones 41.

Figure 5:
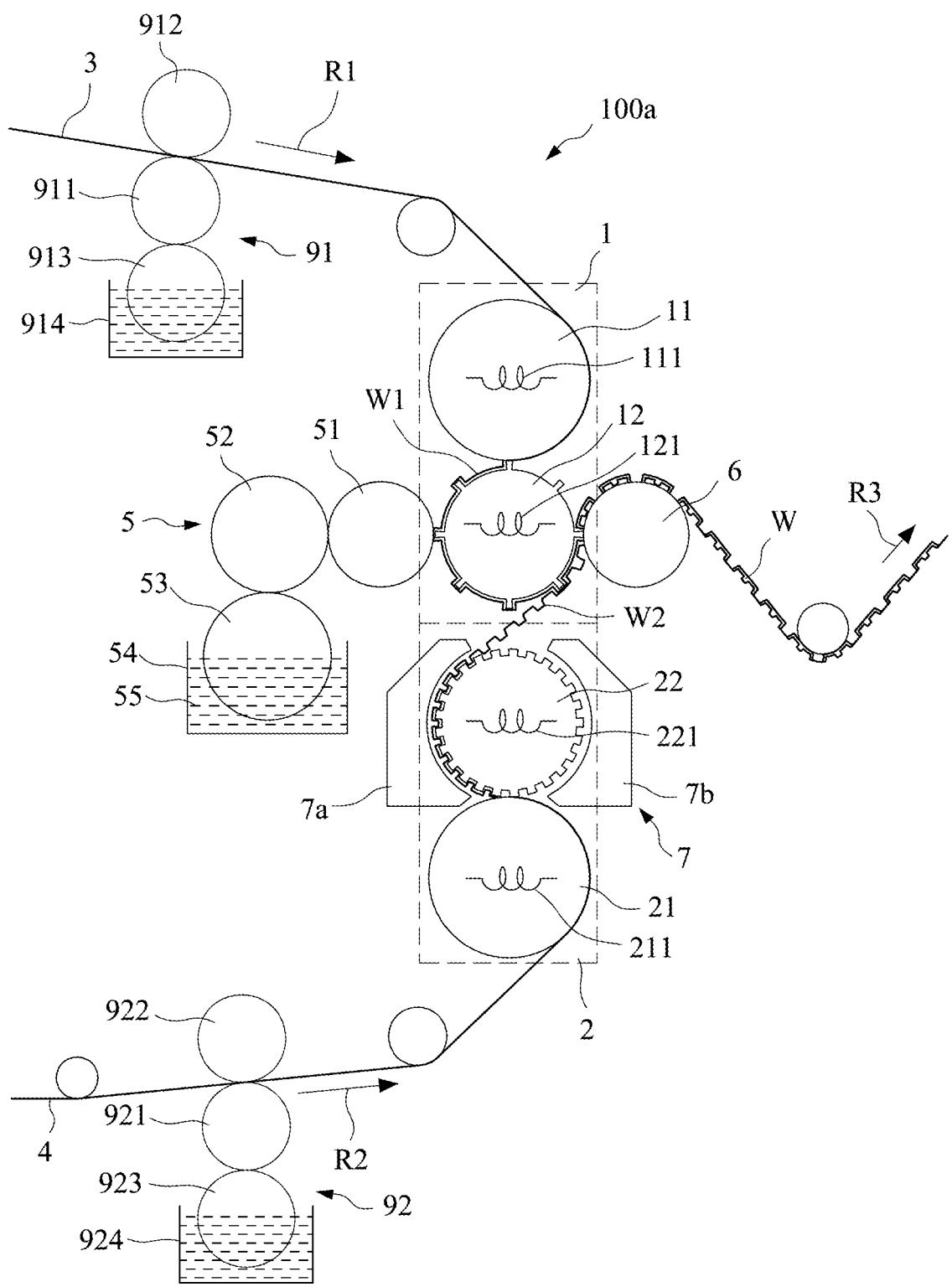
FIG. 5 is a schematic view showing an embossing apparatus according to a second embodiment of the present invention.

FIG. 5 is a cross-sectional view showing a second embodiment of the present invention. The constituent components of the instant embodiment are generally similar to those of the first embodiment, so that similar components are designated with the same references for consistency. In the embossing apparatus 100a of the instant embodiment, a first water applicator device 91 is arranged on the first feeding path R1 to humidify or wet the first web product 3 before it is conveyed to the first rubber embossing roller 11 of the first embossing assembly 1; and a second water applicator device 92 is arranged on the second feeding path R2 to humidify and thus wet the second web product 4 before it is conveyed to the second rubber embossing roller 21 of the second embossing assembly 2.

The first water applicator device 91 comprises a pair of first applicator rollers 911, 912 that are corresponding to and closely adjacent to and in contact with each other, and one of the first applicator rollers, which is the first applicator roller 912 in this case, is closely adjacent to and in contact with a first water attaching roller 913. When the first web product 3 is passing through the first applicator rollers 911, 912 that are rotating, water held in a first water reservoir 914 can be retrieved by the first water attaching roller 913 to feed to the first applicator rollers 911, 912, which apply a proper amount of water to one or two surfaces of the first web product 3.

The second water applicator device 92 comprises a pair of second applicator rollers 921, 922, that are corresponding to and closely adjacent to and in contact with each other, and one of the second applicator rollers, which is the second applicator roller 922 in this case, is closely adjacent to and in contact with a second water attaching roller 923. When the second web product 4 is passing through the second applicator rollers 921, 922 that are rotating, water held in a second water reservoir 924 can be retrieved by the second water attaching roller 923 to feed to the second applicator rollers 921, 922, which apply a proper amount of water to one or two surfaces of the second web product 4.

The embodiments described above are provided only for illustrating the present invention and are not intended to limit the scope of the present invention that is defined in the claims. Equivalent modifications or substitutes that come in the inventive spirit disclosed in the present invention are considered falling within the scope defined by the claims.

What is claimed is:
1. An embossing apparatus for producing a fluffy multilayer web product, the embossing apparatus comprising:
   a first embossing assembly for forming a first embossed pattern to a first web product, the first embossing assembly including:
   a first rubber embossing roller; and a first steel embossing roller adjacent to the first rubber embossing roller;

wherein the first web product is conveyed along a first feeding path to reach and pass between the first rubber embossing roller and the first steel embossing roller to have the first web product formed with the first embossed pattern;

a first humidifying device arranged on the first feeding path to humidify the first web product prior to the first web product reaching the first embossing assembly, the first humidifying device including:

a first piezoelectric component;

a first spray nozzle;

a first water supply pipe connected to the first spray nozzle; and a first driving circuit electrically connected with the first piezoelectric component;

wherein the first driving circuit drives the first piezoelectric component to induce ultrasonic oscillation in water passing through the first water supply pipe to generate water mist at the first spray nozzle to humidify the first web product moving along the first feeding path prior to the first web product reaching the first embossing assembly;

a second embossing assembly arranged at a lower position relative to the first embossing assembly for forming a second embossed pattern to a second web product, the second embossing assembly including:

a second rubber embossing roller; and a second steel embossing roller adjacent to the second rubber embossing roller and also adjacent to the first steel embossing roller;

wherein the second web product is conveyed along a second feeding path to reach and pass between the second rubber embossing roller and the second steel embossing roller to have the second web product formed with the second embossed pattern;

a second humidifying device arranged on the second feeding path to humidify the second web product prior to the second web product reaching the second embossing assembly, the second humidifying device including:

a second piezoelectric component;

a second spray nozzle;

a second water supply pipe connected to the second spray nozzle; and a second driving circuit electrically connected with the second piezoelectric component;

wherein the second driving circuit drives the second piezoelectric component to induce ultrasonic oscillation in water passing through the second water supply pipe to generate water mist at the second spray nozzle to humidify the second web product moving along the second feeding path;

a glue applying device adjacent to the first steel embossing roller to apply glue on a surface of the first web product formed with the first embossed pattern and passing between the first steel embossing roller and the glue applying device; and a laminating roller adjacent to the first steel embossing roller to have the first web product formed with the first embossed pattern and whose surface has glue applied thereon and the second web product formed with the second embossed pattern laminated together in passing between the laminating roller and the first steel embossing roller and subsequently fed out along an out-feeding path.

2. The embossing apparatus according to claim 1, wherein the second embossing assembly further includes an airflow guide device having a pair of airflow hoods facing towards each other to cover and enclose at least a portion of a roller surface of the second steel embossing roller, wherein each of the pair of airflow hoods has formed thereon a concave arc section facing a corresponding portion of the roller surface of the second steel embossing roller, and a plurality of nozzles are formed in the concave arc section of each of the pair of airflow hoods.

3. The embossing apparatus according to claim 2, wherein the airflow guide device further includes a hot air source for allowing the airflow guide device to supply hot airflow via the plurality of nozzles of each of the pair of airflow hoods for blowing towards the roller surface of the second steel embossing roller.

4. The embossing apparatus according to claim 2, wherein the airflow guide device further includes a cold air source for allowing the airflow guide device to supply cold airflow via the plurality of nozzles of each of the pair of airflow hoods for blowing towards the roller surface of the second steel embossing roller.

5. The embossing apparatus according to claim 1, wherein the first embossing assembly and the second embossing assembly are arranged in a vertical configuration, and wherein the first steel embossing roller is arranged at a lower position relative to the first rubber embossing roller in a vertical direction, and wherein the second steel embossing roller is arranged at an upper position relative to the second rubber embossing roller in a vertical direction.

6. The embossing apparatus according to claim 1, wherein:

the first feeding path is set at an upper position relative to the first rubber embossing roller, thereby the first web product is conveyed over an upper side of the first rubber embossing roller to reach and pass between the first rubber embossing roller and the first steel embossing roller; and the second feeding path is set at a lower position relative to the second rubber embossing roller, thereby the second web product is conveyed over a lower side of the second rubber embossing roller to reach and pass between the second rubber embossing roller and the second steel embossing roller.

7. The embossing apparatus according to claim 1, wherein each of the first steel embossing roller and the second steel embossing roller are provided with a heating device to, respectively, heat the first steel embossing roller and the second steel embossing roller.

8. The embossing apparatus according to claim 7, wherein each of the first rubber embossing roller and the second rubber embossing roller are provided with a heating device to, respectively, heat the first rubber embossing roller and the second rubber embossing roller.

9. An embossing apparatus for producing a fluffy multi-layer web product, the embossing apparatus comprising:

a first embossing assembly for forming a first embossed pattern to a first web product, the first embossing assembly including:

a first rubber embossing roller; and a first steel embossing roller adjacent to the first rubber embossing roller;

wherein the first web product is conveyed along a first feeding path to reach and pass between the first rubber embossing roller and the first steel embossing roller to have the first web product formed with the first embossed pattern;

a first humidifying device arranged on the first feeding path to humidify the first web product prior to the first web product reaching the first embossing assembly, the first humidifying device including:
a pair of first applicator rollers adjacent to and in contact with each other, the first web product passing between the pair of first applicator rollers;
a first water attaching roller adjacent to and in contact with a corresponding first applicator roller of the pair of first applicator rollers; and
a first water reservoir, the first water reservoir holding therein water;
wherein when the first web product is passing between the pair of first applicator rollers, the water held in the first water reservoir is fed through the first water attaching roller and the pair of first applicator rollers for being applied to at least one of two surfaces of the first web product;
 a second embossing assembly arranged at a lower position relative to the first embossing assembly for forming a second embossed pattern to a second web product, the second embossing assembly including:
a second rubber embossing roller; and
a second steel embossing roller adjacent to the second rubber embossing roller and also adjacent to the first steel embossing roller;
wherein the second web product is conveyed along a second feeding path to reach and pass between the second rubber embossing roller and the second steel embossing roller to have the second web product formed with the second embossed pattern;
 a second humidifying device arranged on the second feeding path to humidify the second web product prior to the second web product reaching the second embossing assembly, the second humidifying device including:
a pair of second applicator rollers adjacent to and in contact with each other, the second web product passing between the pair of second applicator rollers;
a second water attaching roller adjacent to and in contact with a corresponding second applicator roller of the pair of second applicator rollers; and
a second water reservoir, the second water reservoir holding therein water;
wherein when the second web product is passing between the pair of second applicator rollers, the water held in the second water reservoir is fed through the second water attaching roller and the pair of second applicator rollers for being applied to at least one of two surfaces of the second web product;
 a glue applying device adjacent to the first steel embossing roller to apply glue on a surface of the first web product formed with the first embossed pattern and passing between the first steel embossing roller and the glue applying device; and
 a laminating roller adjacent to the first steel embossing roller to have the first web product formed with the first embossed pattern and whose surface has glue applied thereon and the second web product formed with the second embossed pattern laminated together in passing between the laminating roller and the first steel embossing roller and subsequently fed out along an out-feeding path.

\* \* \* \* \*